Inventors:
Friedrich Sass
Martin Krauss
Their Attorney.

Patented Jan. 7, 1930

1,742,971

UNITED STATES PATENT OFFICE

FRIEDRICH SASS AND MARTIN KRAUSS, OF CHARLOTTENBURG, GERMANY, ASSIGNOR TO GENERAL ELECTRIC COMPANY, A CORPORATION OF NEW YORK

INTERNAL-COMBUSTION ENGINE

Application filed December 4, 1928, Serial No. 323,608, and in Germany December 2, 1927.

The present invention relates to internal combustion engines and especially to such engines wherein fuel is introduced into the combustion chamber by means of a plurality of nozzles having openings in their ends through which the fuel is ejected.

The object of our invention is to provide an improved construction and arrangement of fuel nozzles and combustion chamber whereby the relation between the air space and the space swept by the fuel jets can be regulated so as to ensure complete combustion of the fuel.

A further object of the invention is to provide an improved cylinder construction whereby the air in the combustion chamber is caused to circulate around the combustion chamber and in a manner to produce a more effective mixing of the fuel with the air.

For a consideration of what we believe to be novel and our invention, attention is directed to the accompanying description and the claims appended thereto.

Figure 1:
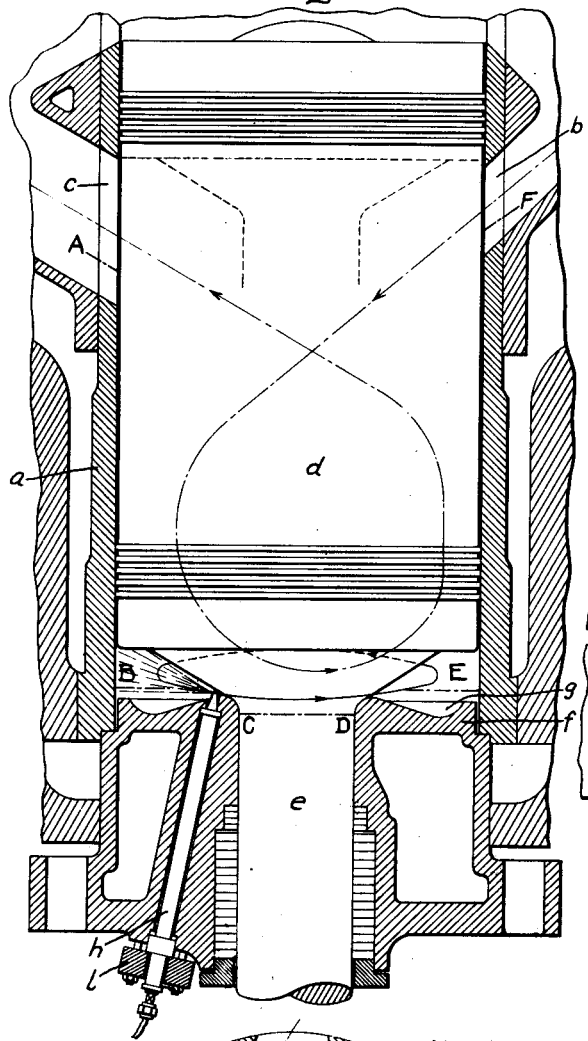
Figure 3:
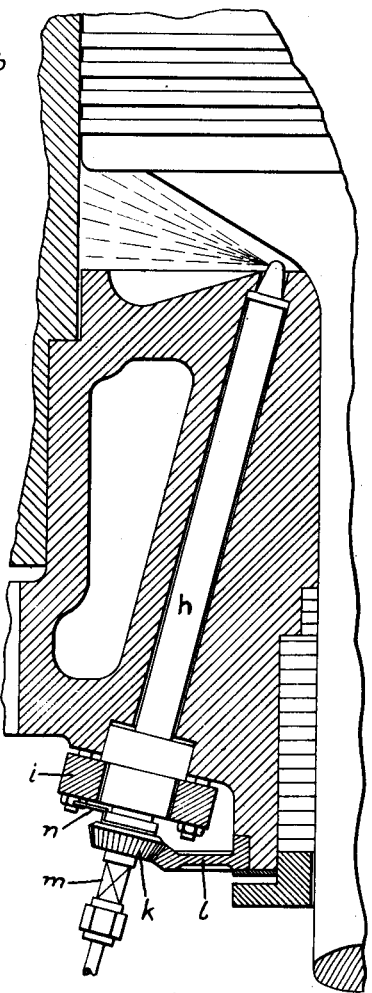
Figure 2:
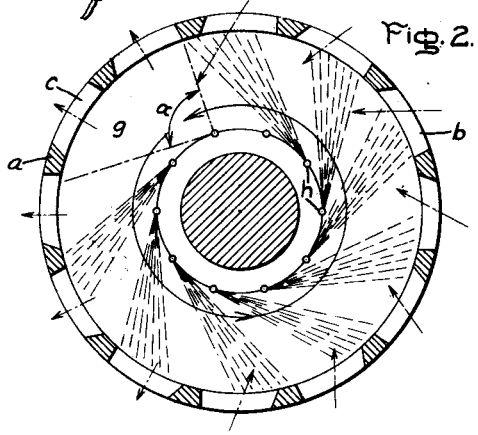
Figure 4:
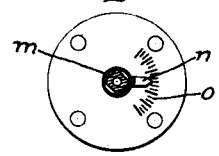

In the drawing, Fig. 1 is a longitudinal section through a portion of a cylinder of an internal combustion engine of the double-acting type, only a portion of the structure sufficient to illustrate the invention being shown; Fig. 2 is a sectional view taken on lines A, B, C, D, E and F, Fig. 1; Fig. 3 is a detail, sectional view on a larger scale illustrating specifically one of the nozzles and adjusting means for it; and Fig. 4 is a detail view of an indicator which shows the magnitude of the displacement of the fuel nozzles.

Referring to the drawing, $a$ indicates the cylinder of an internal combustion engine provided with inlet slots or ports $b$ and exhaust slots or ports $c$. The scavenging air is admitted through the inlet slots and circulates in the combustion chamber $g$ which is defined by the lower wall of the piston $d$ and piston rod $e$, the cylinder cover $f$ and the cylinder walls.

The inlet slots $b$ slope downwardly as is shown in Fig. 1 and also have their walls shaped so that the slots extend at an angle to the radial as is indicated in Fig. 2. With this arrangement, air entering through the inlet slots $b$ is directed downwardly as indicated by the arrows in Fig. 1 and at the same time, due to the fact that the slots $b$ are at an angle to the radial, the air is given a rotating movement in a counterclockwise direction as is indicated by the arrows in the lower portion of Fig. 1 and in Fig. 2.

It will be understood that the scavenging air is admitted to the cylinder when the piston $d$ is in its upper position, as is indicated by the dot and dash lines in Fig. 1, the piston when in this position uncovering inlet and exhaust ports $b$ and $c$ respectively.

Arranged in a circle around the axis of the combustion chamber are a plurality of fuel nozzles $h$ suitably mounted in the head $f$ of the cylinder. The inner ends of the nozzles project into the combustion chamber and are provided on one side only with one or more nozzle openings through which the fuel is discharged into the combustion chamber. The fuel nozzles are arranged so they may be turned to bring the openings in them to a position wherein the fuel discharged from them will be given a desired angle with the radial. In this manner, the length of the path of the fuel jets to the cylinder wall may be extended as found desirable. In other words, the jets may be turned at an angle $\alpha$ to the radial direction (see Fig. 2). The larger this angle the greater the length of the fuel jet and at the same time, the air space between the nozzles becomes reduced. In Fig. 2, the discharge of the fuel from the nozzle openings is depicted.

The nozzles are preferably arranged so they may be adjusted simultaneously each about its own vertical axis, means being provided for fixing each nozzle in an adjusted position. In the present instance, each nozzle is provided with a beveled pinion $k$ on its outer end which meshes with an annular gear wheel $l$ mounted on the cylinder in a manner such that it can rotate thereon and about the axis of the cylinder as a center. One or more of the nozzles is provided with a squared section $m$ adapted to receive a wrench or similar tool. By turning the one nozzle by means of the squared portion $m$, it will be seen that the nozzle to which the squared section $m$ is connected, will be turned, and also, the beveled pinion k through the intermediary of the gear wheel l, will turn the remaining nozzles. In this manner the nozzles are adjusted simultaneously. i indicates a suitable tightening element by means of which the nozzles may be fixed in adjusted position. Associated with one of the nozzles is an indicating pointer n which moves over a suitable scale o to show the position to which the nozzles are adjusted.

In the use of the invention the nozzles are adjusted to discharge the fuel jets at an angle so that the relation between the space swept by the fuel jets and the size of the air space between the fuel jets for a certain air velocity is such as to give the most efficient operation. The most efficient relation is reached when the air becomes entirely consumed during its passage through the immediately preceding fuel jet, which in turn ensures complete combustion. The circulation of the air in the combustion chamber in the direction in which the fuel jets are discharged tends to improve the operation in that it effects a more even distribution of the fuel throughout the air.

What we claim as new and desire to secure by Letters Patent of the United States is:

1. In an internal combustion engine, the combination of walls defining a combustion chamber, a plurality of nozzles arranged close to the axis of the combustion chamber, said nozzles being supplied with discharge openings on one side only and means for simultaneously adjusting the nozzles about their longitudinal axes whereby the direction of discharge of fuel from the nozzles may be changed.

2. In an internal combustion engine, the combination of walls defining a combustion chamber, means for supplying air to the combustion chamber and imparting to it a circulating movement, a plurality of nozzles arranged close to the axis of the combustion space and through which fuel is supplied to the combustion chamber, said nozzles being supplied with discharge openings on one side only, and means for adjusting the nozzles about their longitudinal axes whereby the direction of discharge of fuel from the nozzles may be adjusted relatively to the direction of circulation of air whereby the length of the jets from the individual nozzles and the relation between the jet space and the air spaces between adjacent jets may be adjusted.

3. In an internal combustion engine, the combination of walls defining a combustion chamber, means for supplying air to the combustion chamber and imparting to it a circulating movement, a plurality of nozzles arranged close to the axis of the combustion space and through which fuel is supplied to the combustion chamber, said nozzles being supplied with discharge openings on one side only, and means for simultaneously adjusting the nozzles about their longitudinal axes whereby the direction of discharge of fuel from the nozzles may be adjusted relatively to the direction of circulation of air whereby the length of the jets from the individual nozzles and the relation between the jet spaces and the air spaces between adjacent jets may be adjusted.

4. In an internal combustion engine, the combination of walls defining a combustion chamber, means for supplying air to the combustion chamber and imparting to it a circumferential circulating movement, a nozzle arranged close to the axis of the combustion space and through which fuel is supplied to the combustion chamber, said nozzle being supplied with discharge openings on one side only, means for adjusting the nozzle about its longitudinal axis whereby the direction of discharge of fuel from the nozzle may be adjusted relatively to the direction of circulation of air whereby the length of the jet from the nozzle and the relation between the jet space and the remaining air space may be adjusted and means indicating the magnitude of adjustment of said nozzle.

5. In an internal combustion engine, the combination of walls defining a combustion chamber, means for supplying air to the combustion chamber and imparting to it a circumferential circulating movement, a plurality of nozzles arranged close to the axis of the combustion space and through which fuel is supplied to the combustion chamber, said nozzles being supplied with discharge openings on one side only, means for simultaneously adjusting the nozzles about their longitudinal axes whereby the direction of discharge of fuel from the nozzles may be adjusted relatively to the direction of circulation of air whereby the length of the jets from the individual nozzles and the relation between the jet spaces and the intermediate air spaces between adjacent jets may be adjusted and means indicating the magnitude of adjustment of all of said nozzles.

In witness whereof, we have hereunto set our hands this 17th day of November, 1928.

FRIEDRICH SASS.
MARTIN KRAUSS.